United States Patent [19]

Gulette

[11] Patent Number: 4,723,729
[45] Date of Patent: Feb. 9, 1988

[54] SEAT BELT RETRACTOR WITH CURVED TOOTH AUXILLIARY GEAR

[75] Inventor: Ronald S. Gulette, Farmington Hills, Mich.

[73] Assignee: Irvin Industries, Inc., Rochester Hills, Mich.

[21] Appl. No.: 919,448

[22] Filed: Oct. 16, 1986

[51] Int. Cl.⁴ .................... B60K 22/40; B65H 75/48
[52] U.S. Cl. .................. 242/107.4 A; 74/577 S
[58] Field of Search ........... 242/107.4 A; 74/577 S, 74/577 SF; 280/806; 297/478

[56] References Cited

U.S. PATENT DOCUMENTS

| | | | |
|---|---|---|---|
| 4,238,087 | 12/1980 | Makishima | 242/107.4 A |
| 4,249,708 | 2/1981 | Asano | 242/107.4 A X |
| 4,403,751 | 9/1983 | Asano | 242/107.4 A X |
| 4,492,349 | 1/1985 | Stamboulian | 242/107.4 A |
| 4,518,132 | 5/1985 | Schmidt | 242/107.4 A |
| 4,605,180 | 8/1986 | Fisher et al. | 242/107.4 A |
| 4,632,331 | 12/1986 | Bracnik et al. | 242/107.4 A |

FOREIGN PATENT DOCUMENTS 2070913 9/1981 United Kingdom ........ 242/107.4 A

Primary Examiner—Stuart S. Levy
Assistant Examiner—Joseph J. Hail, III
Attorney, Agent, or Firm—Lloyd M. Forster

[57] ABSTRACT

Retractor for front seat belt having inertia responsive pivoted latch bar for engaging main ratchet sprocket gears to arrest belt extraction, and an auxilliary sprocket gear with radially elongated teeth engaged by pivoted lever finger actuated by inertia pendulum for raising lever and latch bar into main gear arresting engagement characterized by auxilliary sprocket gear teeth each having a concave surface for finger point engagement adapted to increase the lever actuating moment arm at the extremity of tooth contact relative to that of prior straight tooth surfaces.

8 Claims, 8 Drawing Figures

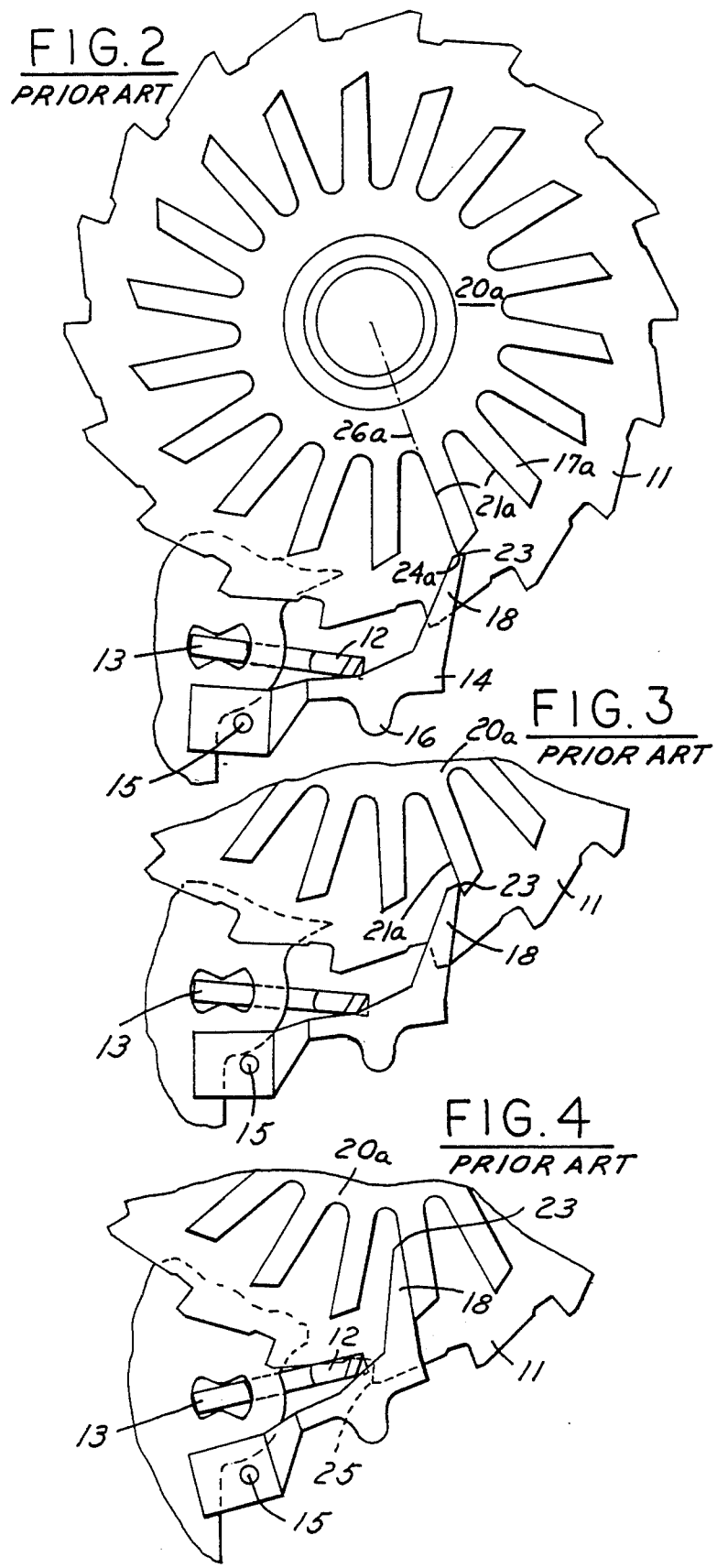

SEAT BELT RETRACTOR WITH CURVED TOOTH AUXILLIARY GEAR

BACKGROUND OF THE INVENTION

Automotive safety belt retractors having an inertia actuated latch against belt extraction conventionally employ a pivoted latch bar for engaging the teeth of a pair of one-way ratchet sprocket gears actuated to engaging position by an inertia element responsive to vehicle deceleration. The latch bar is in a normally disengaged position and must be raised through a substantial arc to reach a fully engaged ratchet tooth position.

In order to minimize the size and stroke of a suspended pendulum or other type of inertia element for actuating the latch bar, an auxilliary sprocket gear is normally employed in fixed concentric relation to one of the dual ratchet gears with an equal number of elongated teeth adapted for preliminary engagement by initial pivotal movement of a lever produced by the inertia element when initially displaced, such lever in turn raising the latch bar to its ratchet gear tooth engaging position. The extended tooth form is adapted to produce additional arcuate lever actuation sufficient to pivot the latch bar into full latch engagement.

The relative geometry of the pivoted lever having a narrow finger for engaging the elongated auxilliary tooth is such as to produce a radial sliding of the lever tooth contact point radially inward along the elongated tooth which multiplies the angular displacement of the lever, and corresponding displacement of the latch bar, relative to the angular travel of the elongated tooth as required to produce full engagement of the latch bar with minimal lost motion following pendulum displacement. The conventional prior art form of the elongated auxilliary gear tooth has been a narrow straight tooth form with the engagement face in radial alignment with the gear axis. The narrow finger of the lever arm has an elongated tapered finger form terminating in a sharp point adapted to initially engage the actuating side of a sharp point of the elongated tooth.

In order to maximize the ratio of arcuate travel of the lever arm and latch bar relative to the sprocket gears, and thereby minimize lost motion to produce belt locking against extraction, it is desirable for the angle between the line passing through the lever pivot and its finger point of initial contact with the elongated tooth extremity and a line normal to the initial engaging contact surface of such tooth be as small as possible consistent with free-sliding contact of the lever engagement point with the elongated tooth surface following the initial engagement. The effective "angle of friction" for the plastic materials involved defines a limit for reducing such angle since any possible sticking upon initial contact may cause fracturing of the tooth or lever finger, or both. Moreover, even if a sliding angle is provided relative to the effective "angle of friction" of the plastic parts, an impact stress may be involved at the contact points proportional not only to suddenness of belt extraction and retraction spool acceleration, but also proportional to the impact force vector which is ineffective to produce lever pivoting. Repeated impact of the tips at an angle close to the "angle of friction" may dull the points and enhance the possibility of tip engagement at a jamming angle. In practice a 14° design-angle has been employed on the assumption that it provides an adequate margin of safety for assuring sliding upon initial contact as well as an acceptable rate of latch bar engagement; however, due to impact of contact points, tolerance extremities, irregularities including wear at the contact points, and sliding tooth surface, as well as other possible unknown factors, jamming of the contact points, and fracturing of the tooth or finger element, or both have been found to occur occassionally resulting in malfunction and service requirement.

SUMMARY OF THE PRESENT INVENTION

Applicant has found a way to produce a substantially greater safety angle of contact relationship, without any loss of ratio in the angle of lever to tooth displacement, by the simple expedient of modifying the auxilliary gear tooth form from a straight slide surface to a curved slide surface with a center of curvature displaced from the lever pivot to increase the lever actuating moment arm of contact force normal to tooth surface at the point extremity of the elongated tooth. Such normal line of force is displaced almost 20° from a line normal to the straight radial line of the prior art tooth form. No change in the position or construction of the lever, or any other change in the component parts or their geometry has been necessary to achieve this improvement in contact angle which has substantially eliminated the problem of occassional misengagement, jamming and tooth or finger fracturing.

BRIEF DESCRIPTION OF THE DRAWINGS

FIG. 2 is a fragmentary view of prior art main sprocket gear, auxilliary sprocket gear, pivoted inertia element response lever, and pivoted latch in a missed engagement relationship;

FIG. 3 is a fragmentary view of the components of FIG. 2 shown in an initial engagement relationship;

FIG. 4 is a fragmentary view similar to FIG. 3 showing the components in a full latch engagement relationship;

DETAILED DESCRIPTION OF PREFERRED EMBODIMENT

Figure 1:
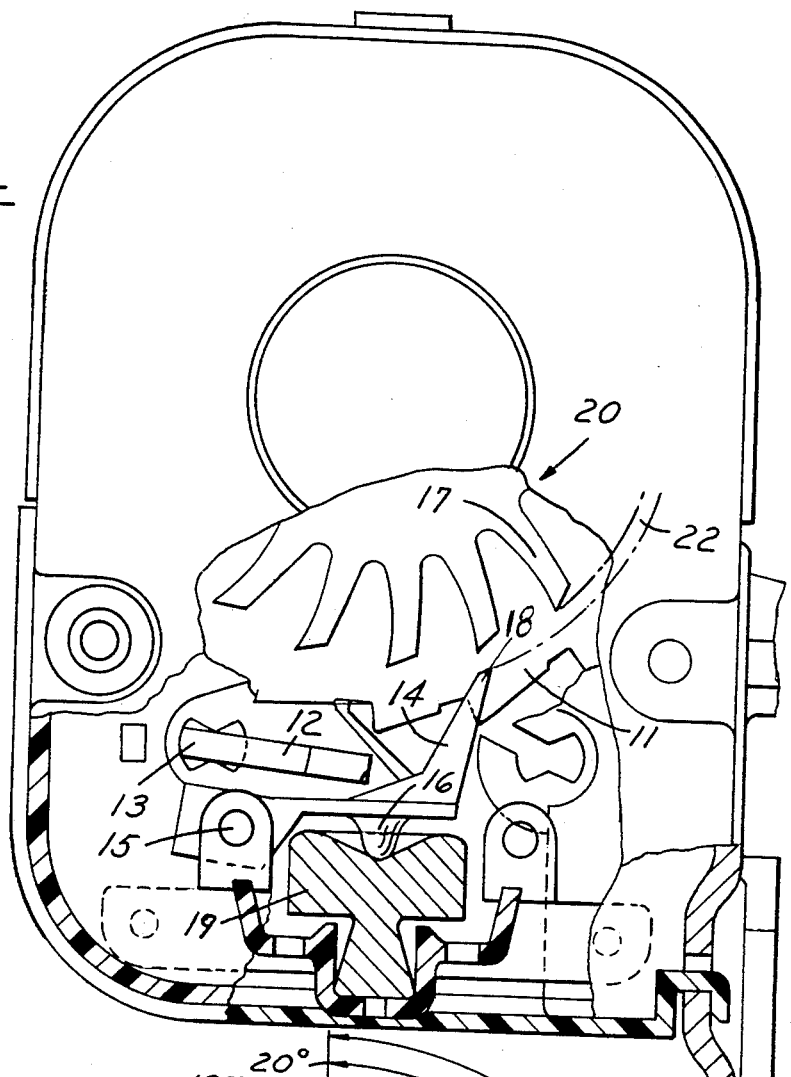
FIG. 1 is a sectional view of a retractor equipped with a curved tooth auxilliary sprocket gear of the present invention.

With reference to FIG. 1, retractor 10 is provided with a pair of conventional main ratchet-form sprocket gears 11, latch bar 12 pivoted at 13 for engaging the sprocket gears 11 shown in disengaged portion, actuating lever 14 pivoted at 15 having an upper latch bar engaging surface and lower projection 16 actuated by inertia element 19, to raise lever 14 and its finger projection 18 into engagement with a curved tooth 17 of auxilliary sprocket gear 20 of the present invention in reponse to predetermined vehicle deceleration sufficient to tip inertia element 19 from its neutral position shown.

With reference to FIG. 2, the functional elements of FIG. 1 are shown in operating relationship with a substitute prior art auxilliary sprocket gear 20a having each tooth 17a formed with straight radial engaging surface 21a, and illustrated with lever 14 finger 18 elevated by initially tipped condition of inertia element 19, not shown in FIG. 2, to an initial auxilliary sprocket tooth engaging position having clearance 22 illustrated in FIG. 1 taken up, but with finger point 23 in bypassing relation to tooth point 24a as would occur when the timing of inertia element 19 tipping was such as to just miss lever tip engagement with a passing auxilliary sprocket tooth.

With reference to FIG. 3, the elements of FIG. 2 are illustrated with point 23 shown in initial engaging relationship with tooth surface 21a.

With reference to FIG. 4, the elements of FIG. 3 are shown after clockwise rotation of auxilliary sprocket gear 20a has produced full actuation of finger 18 to the engaging position of latch bar 12 with ratchet teeth 25 of main sprocket gears 11.

Figure 5:
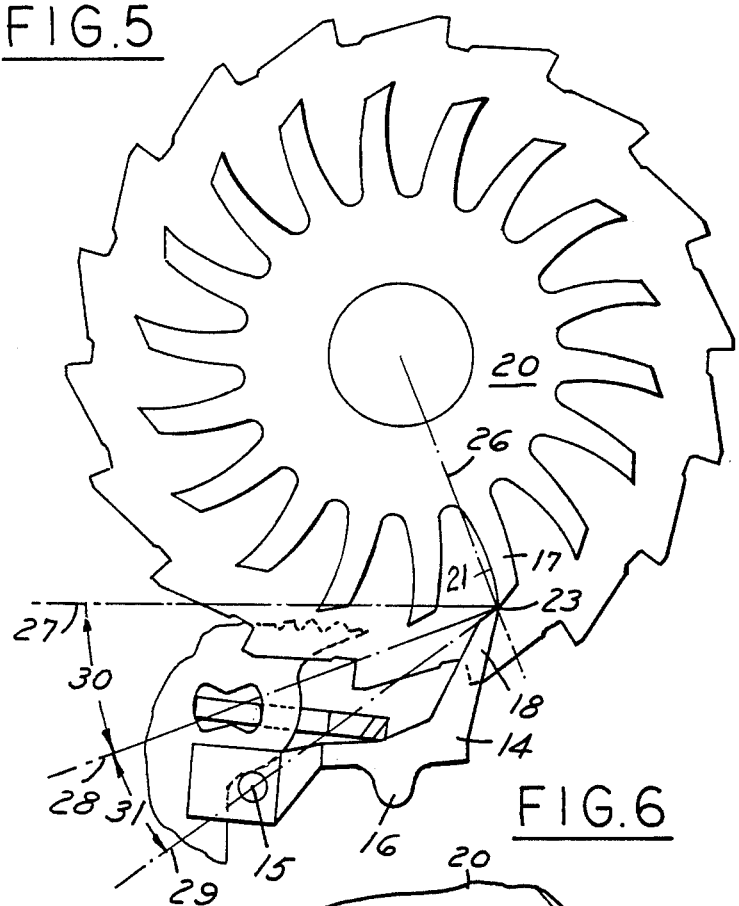
FIG. 5 is a view similar to FIG. 2 showing a curved tooth form auxilliary sprocket gear of the present invention with the tips of lever finger, and curved tooth in point-to-point relationship.

With reference to FIG. 5, auxilliary sprocket gear 20 of the present invention is illustrated in geometric relationship to actuating lever 14 when the respective tips of curved tooth 17 and lever finger 18 are in point-to-point contact. Radial line 26 passing through point extremity of curve tooth 17 corresponds to radial line 26a in FIG. 2 which is coincident with the contact surface 21a of the prior art elongated gear teeth. Accordingly, the beginning and end positions of finger point 23, shown respectively in FIGS. 5 and 7 are the same as in the prior art shown in FIGS. 2 and 4 and it is only the curved path of such point along the curved tooth surface 21 that differs from the prior art resulting in an equal average ratio of lever 14 to gear 20/20a angular travel in each case.

Figure 6:
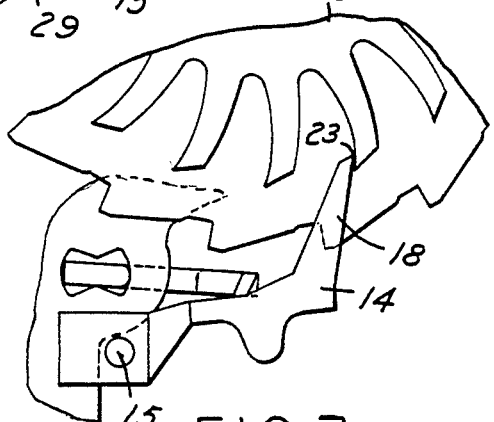
FIG. 6 is a fragmentary view of the components of FIG. 5 showing an initial engagement relationship corresponding to that of prior art FIG. 3.
Figure 7:
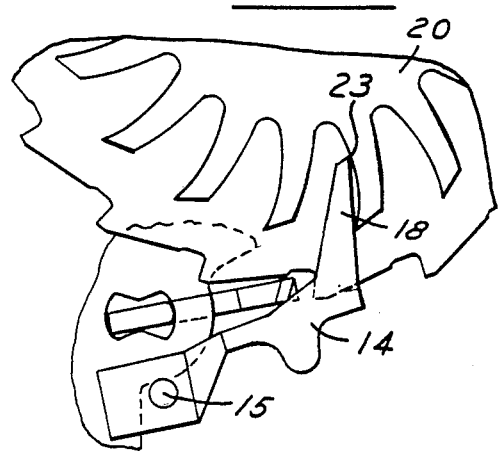
FIG. 7 is a fragmentary view of the elements illustrated in FIG. 6 with advanced engagement corresponding to that illustrated in prior art FIG. 4.

The significant difference of the curved tooth form contact surface 21 shown in FIGS. 5–7 from the straight surface 21a of the prior art shown in FIGS. 2–4 lies in the relative relationship of a geometric line normal to the curved contact surface 21 at its extemity point as shown at 27 to the corresponding normal line 28 to the straight tooth contact surface 21a and the respective difference of such normal lines 27 and 28 relative to the line 29 passing from the contact tip 23 of finger 18 through pivot 15. Thus, the almost 20° increase of arc 30 over the approach angle of arc 31 between the line 29 and the line normal to the contact surface 21/21a at the extremity contact tip assures a sliding rather than possible sticking and jamming initial contact of point 23 with the actuating contact surface 21 of gear tooth 17.

Even though the initial ratio of amplified pivotal actuation of lever 14 is somewhat less with a curved tooth form of FIG. 5, the average ratio will end up the same by the time the contact point 23 reaches the position of FIG. 7 in a continuously increasing departure of the line 29 from the angle of friction relative to contact surface 21 as the contact point progresses from FIG. 5 to FIG. 7 position assuring a non-sticking actuation throughout the actuation of lever 14.

Figure 8:
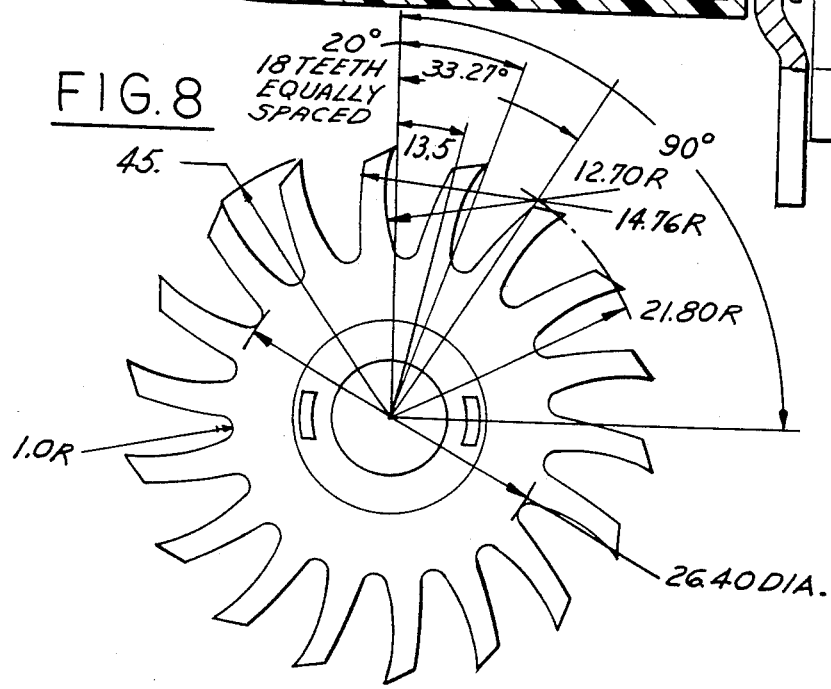
FIG. 8 is a further view of the auxilliary sprocket gear per se shown in the assembly view of FIG. 5 illustrating typical construction dimensional geometry.

With reference to FIG. 8, details of geometric dimensions expressed in millimeters serve as a specific example of a typical auxilliary gear constructed with curved teeth in accordance with the present invention which has served to effectively solve the problem of occassional tooth and/or finger breakage experienced with the prior art straight contact surface tooth form.

I claim:

1. A retractor for a front seat belt having an inertia responsive pivoted latch bar engaging main ratchet sprocket gears to arrest belt extraction, and an auxilliary sprocket gear with radially elongated teeth each with an outward extremity engaged by a finger point (23) of a pivoted lever (14) actuated by an inertia element (19) for raising the lever and the latch bar into main gear arresting engagement, characterized by the auxilliary sprocket gear teeth each having a concave surface for finger point engagement adpated to increase the lever actuating moment arm at the outward extremity of tooth contact relative to that of straight radial tooth surface, said finger point engaging said concave surface at said outward extremity upon emergency actuation of said inertia element and progressing inwardly in continuous contact with said concave surface to an inward extremity on a radial line of the auxillary sprocket gear passing through said outward extremity.

2. Retractor of claim 1 wherein said concave surface comprises a circular arc.

3. Retractor of claim 2 wherein a normal line extending from said circular arc at the radially outward extremity point forms an angle in the order of 20° from a line normal to a radial line passing through said extremity point.

4. Retractor of claim 2 wherein said auxilliary sprocket gear and said pivoted lever are constructed of plastic material.

5. Retractor of claim 3 wherein a back of each auxilliary sprocket gear tooth is formed with an outward extremity portion forming a concentric arc with said circular contact surface arc.

6. Retractor of claim 3 wherein said auxilliary sprocket gear and said pivoted lever are constructed of plastic material.

7. Retractor of claim 5 wherein said auxilliary sprocket gear and said pivoted lever are constructed of plastic material.

8. Retractor of claim 1 wherein said auxilliary sprocket gear and said pivoted lever are constructed of plastic material.

* * * * *